United States Patent
Eksten et al.

(10) Patent No.: US 12,470,776 B2
(45) Date of Patent: Nov. 11, 2025

(54) OPTIMIZED OVER-THE-TOP DELIVERY OF CONTENT FOR LINEAR SERVICES

(71) Applicant: Q'LIGENT CORPORATION, Melbourne, FL (US)

(72) Inventors: Brick Eksten, Uxbridge (CA); Andrey Gaynulin, Nizhny Novgorod (RU)

(73) Assignee: Q'LIGENT CORPORATION, Melbourne, FL (US)

( * ) Notice: Subject to any disclaimer, the term of this patent is extended or adjusted under 35 U.S.C. 154(b) by 400 days.

(21) Appl. No.: 18/089,544

(22) Filed: Dec. 27, 2022

(65) Prior Publication Data

US 2023/0217082 A1   Jul. 6, 2023

Related U.S. Application Data

(60) Provisional application No. 63/293,745, filed on Dec. 24, 2021.

(51) Int. Cl.
  *H04N 21/61*   (2011.01)
  *H04N 21/6338*   (2011.01)

(52) U.S. Cl.
  CPC ..... *H04N 21/6125* (2013.01); *H04N 21/6338* (2013.01)

(58) Field of Classification Search
  None
  See application file for complete search history.

(56) References Cited

U.S. PATENT DOCUMENTS

| | | |
|---|---|---|
| 6,208,735 B1 * | 3/2001 | Cox .......... H04N 19/467 380/54 |
| 9,277,266 B2 | 3/2016 | Riedl et al. |
| 9,319,730 B2 | 4/2016 | Krasko et al. |
| 9,432,731 B2 | 8/2016 | Mantin |
| 10,009,342 B2 | 6/2018 | Schrempp et al. |
| 10,044,573 B2 | 8/2018 | Zhang et al. |
| 10,291,420 B2 | 5/2019 | Mantin |
| 10,373,196 B2 | 8/2019 | Ma et al. |
| 10,419,797 B2 | 9/2019 | Subramanian |
| 10,469,882 B2 | 11/2019 | Pathak et al. |

(Continued)

FOREIGN PATENT DOCUMENTS

WO   2019111049   6/2019

*Primary Examiner* — Mushfikh I Alam
(74) *Attorney, Agent, or Firm* — John L. DeAngelis; Wolter Van Dyke Davis, Pllc (57) ABSTRACT

A method for providing content as a linear content stream. The method comprises receiving and segregating the content into data packages, identifying each data package with a unique signature, and responsive to a request from a receiving system, receiving first data packages at the receiving system. A modified manifest that identifies each data package according to its unique signature is created. The manifest indicates a location for each data package, and instructs the order in which to assemble identified data packages to create the linear content stream. The linear content stream is created as directed by the modified manifest. Redundant data packages within the first data packages are excluded from the modified manifest and thereby excluded from the linear content stream. White spaces of open time intervals are created in the linear data stream by omission of the redundant data packages and filled with alternative content.

20 Claims, 6 Drawing Sheets

(56) References Cited

U.S. PATENT DOCUMENTS

| | | | |
|---|---|---|---|
| 10,863,211 B1* | 12/2020 | Wu | H04N 21/236 |
| 10,863,250 B2 | 12/2020 | Eksten et al. | |
| 10,911,813 B1* | 2/2021 | Wu | H04N 21/25808 |
| 10,992,981 B2 | 4/2021 | Thielen et al. | |
| 10,999,611 B2 | 5/2021 | Smith et al. | |
| 11,037,304 B1* | 6/2021 | Dall | G06F 16/738 |
| 11,303,939 B2 | 4/2022 | Dunker et al. | |
| 2008/0010653 A1* | 1/2008 | Ollikainen | H04N 21/8358 348/E7.071 |
| 2008/0240678 A1* | 10/2008 | Shiokawa | H04N 9/8205 386/E9.036 |
| 2013/0259228 A1* | 10/2013 | Ren | H04L 9/3236 380/200 |
| 2014/0115626 A1 | 4/2014 | Sarda et al. | |
| 2014/0196079 A1* | 7/2014 | Jannard | H04N 7/1675 725/31 |
| 2015/0033023 A1* | 1/2015 | Xu | H04N 21/8355 713/176 |
| 2015/0256581 A1* | 9/2015 | Kolhi | H04N 21/2662 709/219 |
| 2016/0182941 A1* | 6/2016 | Crabtree | H04N 21/8456 725/115 |
| 2016/0323606 A1* | 11/2016 | Mao | H04N 21/64707 |
| 2016/0360217 A1* | 12/2016 | Wan | H04N 21/44 |
| 2017/0374121 A1* | 12/2017 | Phillips | H04L 65/612 |
| 2018/0227616 A1* | 8/2018 | Ren | H04N 21/8456 |
| 2019/0222872 A1 | 7/2019 | Boham et al. | |
| 2020/0014988 A1* | 1/2020 | Navali | H04N 21/437 |
| 2021/0271893 A1* | 9/2021 | Korenwaitz | G06V 10/761 |
| 2022/0303598 A1* | 9/2022 | Pansare | H04N 21/8456 |
| 2023/0076014 A1* | 3/2023 | Stephens | H04N 21/8456 |

\* cited by examiner

——— Bandwidth    - - - - Redundant Content

——— Bandwidth  ——— Alternate Content

OPTIMIZED OVER-THE-TOP DELIVERY OF CONTENT FOR LINEAR SERVICES

CROSS-REFERENCE TO RELATED APPLICATIONS

The present application claims priority under 35 U.S.C. 119(e) to the provisional patent application filed on Dec. 24, 2021 and assigned application No. 63/293,745. This provisional patent application is incorporated herein in its entirety.

FIELD OF THE INVENTION

The present invention relates to a linear content delivery system or network, leveraging fingerprinting of time intervals of content, detection of redundant content, and dynamic content storage to optimize delivery costs, content quality, and network resiliency.

BACKGROUND OF THE INVENTION

Linear delivery of content is defined in the world of media and entertainment by the structure of the content, that is, a continuous, unbroken and uninterrupted stream of information (content) that is carefully coordinated and delivered synchronously between a sender and a receiver. Today's linear video delivery systems are expensive and complex, but most importantly, they are unable to create unique variants of the content streams.

A traditional premium channel, for example, may use a satellite system as the linear delivery mechanism. While a satellite delivery system is very expensive, it is also very efficient delivering one-to-many data or content streams, where all receivers or recipients receive the same content. This lack of flexibility in the delivery system means that all content modification must be done at the source and all content (i.e., the same content) must be constantly delivered across the entirety of the network.

A typical linear delivery system comprises content senders, content delivery networks, and content receivers. The deployment of receivers, at scale, often number in the thousands, effectively sharing or allocating the delivery costs across all receiving endpoints, but at the cost of flexibility in the end-to-end content delivery system.

Terrestrial networks and services (wired networks or point to point networks) are another option for content delivery, but cost constraints have forced the market to limit the use of terrestrial networks to critical, high value content, such as live sports where the value of the content justifies the bandwidth costs and management complexity.

Multicast networks are also utilized for terrestrial delivery of content in a one-to-many scenario like satellite systems, but these networks require complex network bandwidth management and state-of-the-art equipment to be effective.

The need to deliver high-volume content to massive numbers of end user customers (receivers) has given rise to OTT (over the top) delivery systems where each consumer or receiver is effectively pulling its own content or data stream from a remote storage site. e.g., Netflix. The OTT systems effectively employ ABR (adaptive bitrate delivery). With adaptive bitrate delivery each video stream is segregated into pre-defined units of time each of which is encoded into a multiplicity of formats and resolutions, effectively creating pools of content for each time segment, such that within the pools there are multiple versions of the same content at varying levels of quality and at different bitrates.

Flexibility is one benefit that accompanies this increase in complexity, including the ability to retrieve alternative content during any time unit. However, this feature does little to address the core challenge of delivering continuous content, at scale, where costs continue to represent a significant challenge to the adoption of terrestrial networks.

An ideal scenario combines the cost efficiency of satellite delivery services with the flexibility of OTT delivery, resulting in better cost management and the ability to use the terrestrial networks (the internet) for delivery of content to traditional network endpoints.

BRIEF DESCRIPTION OF THE FIGURES

The skilled artisan will understand that the drawings, as described below, are for illustration purposes only. The drawings are not intended to limit the scope of the present invention in any way.

DESCRIPTION OF THE INVENTION

Before describing in detail the particular methods and apparatuses related to optimized delivery of content in an OTT network, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the inventions.

The presented embodiments are not intended to define limits as to the structures, elements or methods of the inventions, but only to provide exemplary constructions. The embodiments are permissive rather than mandatory and illustrative rather than exhaustive.

Problem

The challenge with providing new data delivery techniques is overcoming the very cost effective (when used at scale) satellite delivery system, where the operators (content owners or distributors) often bear the costs of delivery, while monetization is achieved in the receiver networks, which effectively places a cap on delivery costs, thereby creating a barrier to entry for competing services. A new delivery service that simply leveraged the public networks to replicate traditional satellite delivery services, would face significant cost barriers that would limit the success of such a new service.

The challenge is creating a system with an efficiency comparable to a satellite system (which has the benefit of being a very efficient multicast service) over networks that traditionally are not designed nor enabled to deliver multicast traffic. Ideally, the new system will offer a cost savings over satellite and other traditional linear delivery networks.

To further complicate the situation, the traditional receiver used in linear delivery services comprises equipment that is not designed for the network conditions found in terrestrial networks, such as jitter, data loss, data congestion and other factors that may impede operation of a terrestrial system. Finally, linear delivery systems are also very complex due to the number of systems that must be coordinated upstream of content consumption.

Solution

There are three factors that must be overcome to create network services for content delivery that can compete effectively with a traditional satellite-based system. The first challenge is cost; any new system must compete first and foremost with the traditional cost basis of a satellite system, which is considered a cost benchmark for efficiency at scale. The second challenge is operational reliability, while satellite systems sound technically challenging on paper, they are in fact highly engineered, stable, and efficient systems for high-scale linear delivery. The third challenge is compatibility, as any system that replaces satellite must be compatible with the existing plant infrastructure. It is the first two of these three challenges the inventors address with the present invention.

In addressing the primary challenge of cost, the inventive system must overcome the fact that linear content delivery (e. g., television) is one element of a very complex ecosystem of services, solutions, technology, and infrastructure all of which must run in lock-step with exacting timing requirements, with a further requirement to run in real-time at each end of the delivery chain, that is the source and destination nodes.

In this context, real-time means that each television or content frame must be processed in 1/framerate, where 1 represents a second of measured time and framerate represents the display rate at which playback must occur. In Europe the framerate may equate to 50 Hz, 25 Hz, etc. In the United States the framerate is 60 Hz.

In an OTT delivery system, the continuous stream of information is segregated into data blocks according to specified time intervals, such that a plurality of content frames (pictures or its data equivalent) occupy each time interval.

This data segregation also effects how the data is retrieved from the network. Whereas the receiving system in a linear delivery system is constantly supplied with a continuous stream of data, the OTT receiving system continuously receives updated instructions (in the form of a manifest) advising the content to be retrieved and from where in the network it should be retrieved.

Moving content distribution from a purely linear delivery system to an OTT delivery system also allows buffering within the delivery chain, where the buffering time is equal to the period of one or more time intervals.

Additionally, in the OTT system the content itself is modified by data compression for optimal delivery of content, given the constraints of quality, bitrate, resolution, and targeted bandwidth. In an OTT delivery system, the content is constantly being produced, retrieved, and consumed while the time interval duration, desired content quality, and bitrate targets are predetermined. Thus, one opportunity to materially impact OTT costs is to deliver less content from the source to the destination.

The present invention resolves the issues by decoupling the intent to deliver the content from the actual delivery of the content. The inventive system provides a solution that creates a uniquely registered signature (or hash value) for each content time interval and stores the results in a database. Although the device responsible for assigning the signature acts as a client receiving system, it is not restricted to processing the content time intervals in real-time; it can in fact process content many times faster than real-time.

The registration system can derive signatures at multiple levels of the source data and by managing each signature separately it can create, and update as necessary, a manifest that provides instructions to the receiving system indicating which content time interval is to be retrieved (retrieved by using the content's registered signature), when it is to be inserted into the data (content) stream, and from where content should be retrieved. According to the present invention, content can be stored locally, in the cloud, or on a parallel (peer) system.

One advantageous by-product of the inventive system is the elimination of redundant content (a process referred to as deduplication), thereby preserving bandwidth for cost savings or for the delivery of alternative content. The time interval during which the redundant data is deleted may be referred to as a "white space", with alternative content injected into the white spaces.

Figure 1:
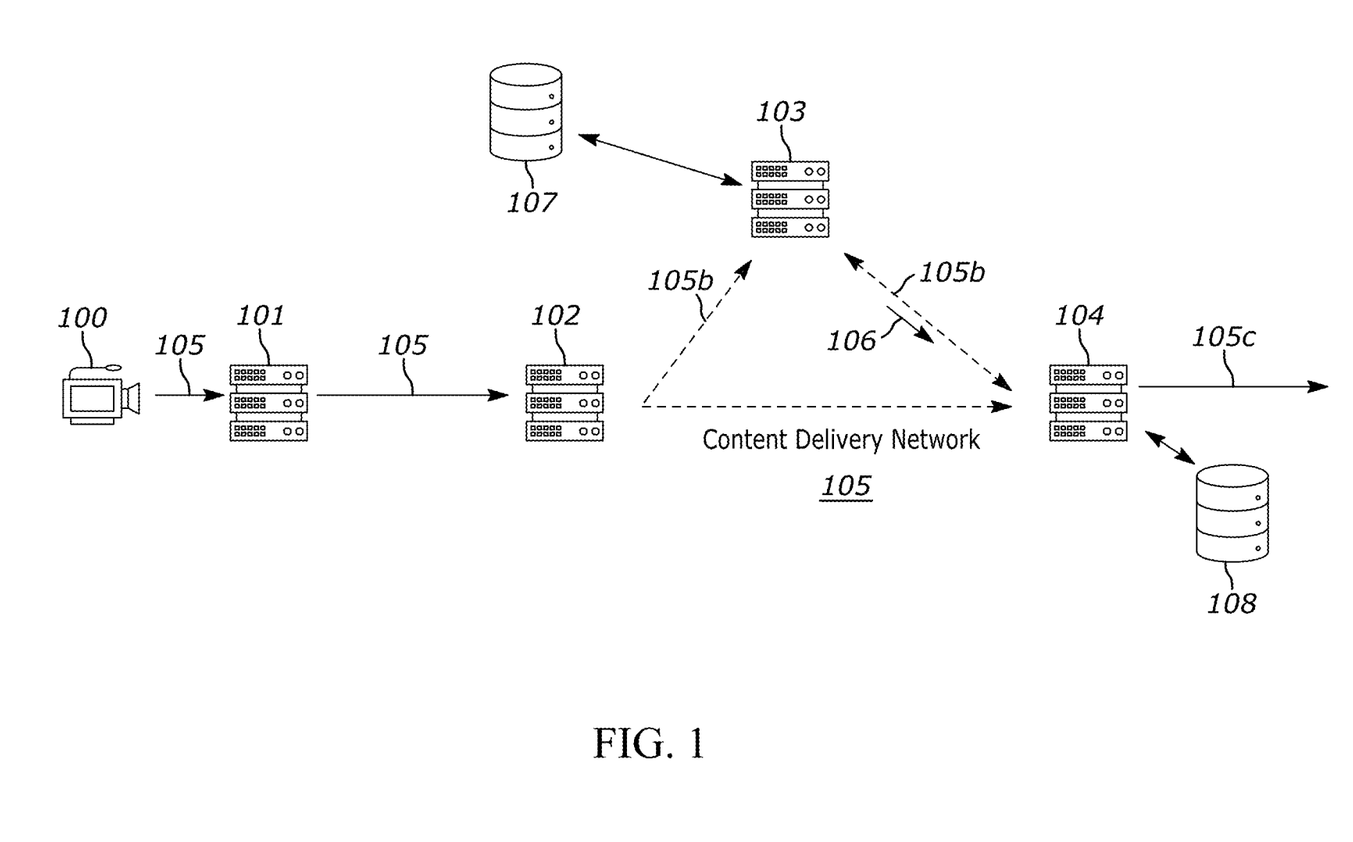
FIG. 1 illustrates a system that determines and eliminates the transmission of redundant data, thereby freeing time slots during which alternative data can be sent over the network.

FIG. 1 depicts a camera 100 as a content source, with the camera output supplied to a linear processing device 101 (such as a playout system, master controller, encoder, etc.). The content is then input to and carried over a linear delivery network (also referred to as a content delivery network) 105 to a packaging and manifest creation system 102 that creates data packages (also referred to as content time intervals or data fragments) in a desired format, each comprising content data bounded by a predetermined time interval.

The packaging system 102 also creates an original manifest that indicates the order in which the data packages are to be reassembled at a receiving system 104. Once the data packages are reassembled into a linear data stream at the receiving system 104, the data stream can be consumed there or input to another network not shown in FIG. 1.

The data packages and the original manifest are sent from the packaging and manifest creation system 102 to the signature engine 103 via a fragmented delivery network 105b.

The signature engine 103 generates a hash (address) for each data package and using the hashes, identifies duplicate data packages (referred to as a deduplication process) within the content stream. A modified manifest 106 (also referred to as a delivery manifest), generated by the signature engine 103 is input to the receiving system 104. The modified manifest identifies the data packages that the receiving system will need to create a linear content stream. And the modified manifest excludes redundant data packages as determined by the signature engine by reviewing the hash (address) for each data package. Finally, the modified manifest may include alternative data packages (alternative content) for inclusion into the linear content stream.

White spaces in the data stream that are created by removal of the redundant data packages can be filed with the alternative data packages, including, for example, pre-delivered content (stored at the receiving system local cache for later use) and locally resourced content (that is also stored at the receiving system local cache).

As shown in FIG. 1, the modified manifest 106 is sent to the receiving system 104 via the fragmented delivery network 105b. The modified manifest is used by the receiving system to request content (data packages) from the packaging system 102, which sends the requested data packages to the receiving system 104 via a content delivery network 105. The data packages are stored in the local fragment storage cache 108 until assembled into a linear data stream at the receiving system 104 according to the modified manifest.

The modified manifest also informs the receiving system which network storage location, such as a local fragment storage cache 108, stores the data packages and the order in which the data packages are to be reassembled to create the linear content stream. The local fragment storage cache 108 in FIG. 1 is intended to represent any one of the network storage caches in any network.

The receiving system 104 retrieves the data packages from the local fragment storage cache 108 or from the closest storage cache. The content stored at the storage cache 108 includes, active content as received from the packaging and manifest creation engine 102, pre-delivered content that had been previously stored in the cache 108, and locally sourced content. The receiving system, using the modified manifest, creates and sends the linear data stream to a downstream network (not shown) over a linear delivery network 105c.

Note that the content delivery network 105 is more than a simple data path as illustrated; in reality it comprises a plurality of receiving systems 104 that each pull data from the same content delivery network, store data packages at various storage locations, and use the data packages to create a data stream that is absent redundant data packages, but may include new data packages inserted into the time intervals (white spaces) vacated by the redundant data packages. In one application, each receiving system reassembles the data packages into a contiguous linear data stream and supplies that data stream over the linear delivery network 105c to a cable television network for transmission to end users.

The system of the invention offers an abstraction between the data that is sent from the source and the data that is retrieved and provided to the destination. The packaging system 102 sends (pushes) data into the content delivery network 105 to be received and stored by each receiving system 104. Then each receiving system 104 (only one shown in FIG. 1) receives the updated manifest from the signature engine and pulls the appropriate data from storage locations on the content delivery network, thereby creating and supplying a linear content stream to a downstream network (not shown in FIG. 1), such as a cable television network as referred to above.

The signature engine receives data faster than real-time. That is, from the camera 100 to the packaging and manifest creation system 102 (see FIG. 1) the data transmission and processing occurs in real-time because it is limited by the cameras output data rate (or any other source system output). The data is then buffered into time-bound fragments by the packaging system 102 and a manifest identifying those fragments is sent from the packaging system to the signature engine 103 at network speed, no longer paced by the clock in the media stream, that is, by the output data rate of the camera 100.

Segregating the data into fragments provides significant advantages. Consider the analogy of a vinyl record. The data (audio on the vinyl record) is recorded sequentially with the content recorded against time, in this case the time base is the revolutions per minute of the recording system. Audio samples are continuously appended one after another.

The problem with such a system is that any break in time makes the system fragile, creating corrupt or distorted data. In a digital delivery system (such as digital radio) any break in time can lead to content dropouts. Therefore, every aspect of the media delivery chain must operate in real-time or risk data loss.

To overcome this system fragility and to provide some flexibility, buffering, in the form of time-bounded slices of data, is advantageously included as a system feature. These slices of data are referred to as fragments (or chunks in common parlance) to identify data (media content, for example) that is no longer handled synchronously.

With the data processed asynchronously (independent of time) the data fragments can be distributed and duplicated, redundant data fragments deleted, and new data fragments substituted into the data stream. The time-bound nature of the data in the form of data fragments provides this flexibility.

For any given media distribution (e.g. a television channel) the invention leverages the use of predefined units of time to organize all data into uniform—time bound and independent fragments. This allows the system to swap one fragment for another (e.g., providing targeted advertising). It also allows the system to exploit gaps (white spaces) in the content delivery stream by positioning other content fragments within those white space gaps. Pre-delivered content and locally-sourced content can also be stored in the local fragment storage cache 108 and this content can be retrieved for insertion into a content stream during a white space.

The system of the invention converts linear data streams (unbroken, sequential) from a source (the camera 100 in FIG. 1) into time-bound data fragments. The signature engine 103 in FIG. 1 identifies each data fragment by assigning a unique signature to each one (preferably created by a hashing algorithm). All the data fragments can then be pushed into the network according to the updated manifest that informs each receiving system which data fragments to retrieve, where to retrieve them, and also the order of data fragments in the created linear data stream.

The content registry 107 in FIG. 1 stores signatures (hashes) of the original content, in the form of data packets, and the content stored at the local cache 108 of each receiving system. The signature engine 103, using data stored in the content registry 107, continuously compares the signatures of the incoming data fragments against what is in the receivers' cache.

The signature engine can also utilize the white spaces to insert other content data that is pre-delivered (i.e., delivered and stored in advance of use) in the receiver's cache. The modified manifest instructs the receiving system to pull this pre-stored content, as well as other content, from a network storage location to create a linear data stream for downstream networks.

For example, assume a premium movie channel is distributing the same movie in a loop. The signature engine ensures that each receiving system has a copy of the movie in its cache and therefore instructs the receiving system to retrieve the movie (data) from its local cache. It is unnecessary to distribute the movie for each loop. Each receiving system must create a constant, linear output, but the source of the movie (data) is irrelevant; the source can be the local cache (pre-delivered local content) or the network stream as stored in the local cache. And in this case, the delivery of redundant content to the receiving station is avoided since the content is already available at the receiving station local cache.

And consider the following example using the modified manifest. A receiving system uses a modified manifest to select from the local cache, data package A and data package B, and data package C, and data package E. But data package D is omitted because it is duplicate with data package B. The receiving system creates the linear data stream using data packages A, B, C, and E and sends it on to the next network.

In another situation, the receiving system creates a new contiguous data stream comprising data packages A, B, C, B, and E. Here B is the same ad and data packages A, C, and E are parts of a television show. The "B" data package is received only once at the receiving system, but aired multiple times during a single television show.

For an identified time interval of content to be available to the system, that content must exist both as an identity in the database of the signature engine 103 of FIG. 1 and in storage at the local fragment storage cache 108 of FIG. 1. If those conditions are satisfied then the system can create the modified manifest 106 (see FIG. 1) from the original manifest, which advises the receiving system that it no longer needs to retrieve certain data packages from the source since the data package(s) is already available in the local fragment storage 108, that is, locally to the receiver 104. The data packages may be stored at other network locations that may be accessible to one or more receiving systems.

Figure 2:
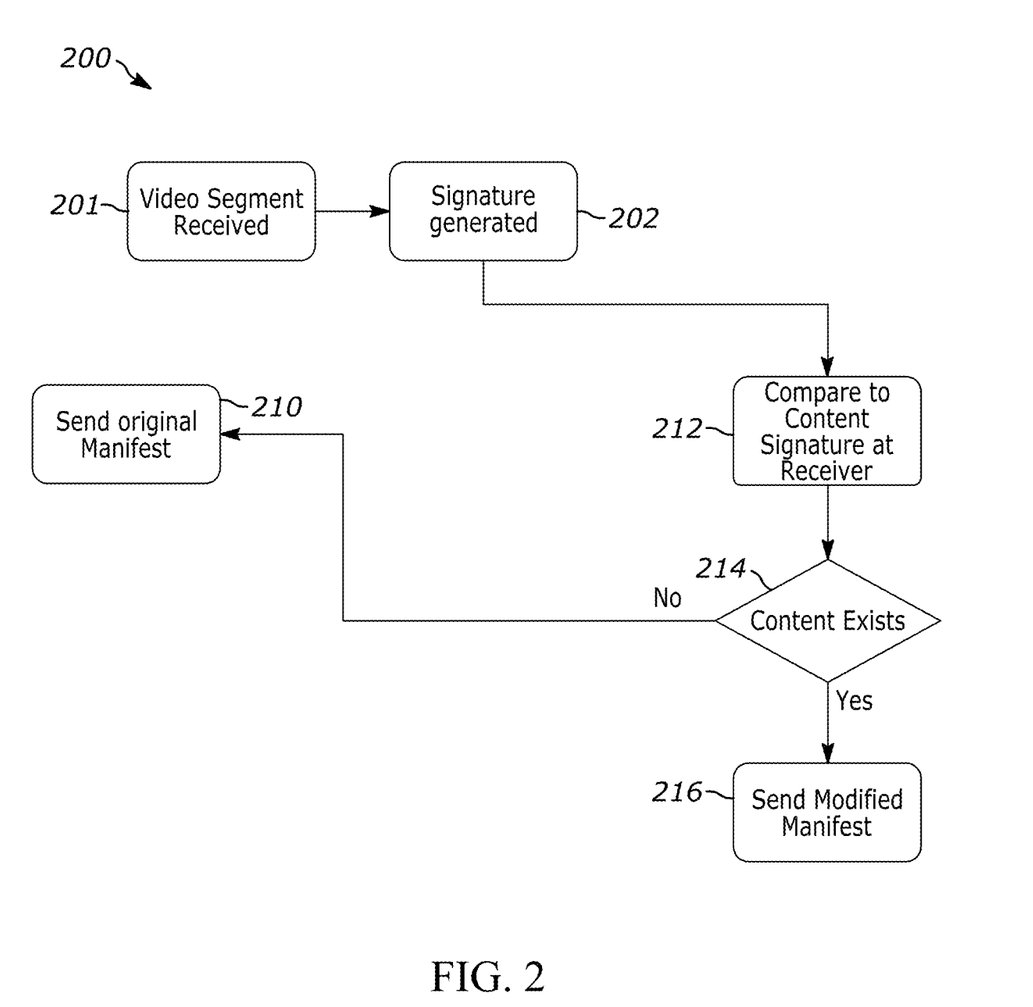
FIG. 2 illustrates a flowchart for detecting redundant data.

FIG. 2 illustrates the basic system operation in the form of a flowchart 200 with reference to specific content, that is a video segment. At a step 201 a video segment (also referred to as a data segment or a content time interval) is received at the signature engine 103 and a signature generated for that segment at a step 202. Preferably, the signature is generated based on a hashing algorithm.

The generated signature is compared to signatures at the receiving system (stored within the local cache) at step 212. These local cache signatures are stored in the content registry database 107 of FIG. 1.

If the generated signature does not match any of the stored signatures (generating a negative result from decision step 214) then the video segment represented by the generated signature is not stored in the local caches and therefore the original manifest is sent from the signature engine 103 to the receiving system 104, where it will be used to request this video segment from the packaging system 102 and will also be used to create the linear delivery stream at the receiving system 104.

If the decision from the decision step 214 is affirmative, then the content already exists in the local cache (it is therefore redundant content) and the manifest is modified to delete reference to this redundant content. Now the modified manifest will be used to request video segments from the packaging system 102, but there is no reference in the modified manifest to the redundant content. The modified manifest will also be used to create the linear delivery stream at the receiving system 104, but again, the redundant content will not appear in the linear data stream. The white space created by omission of the redundant content can be used to transfer other content.

Figure 3:
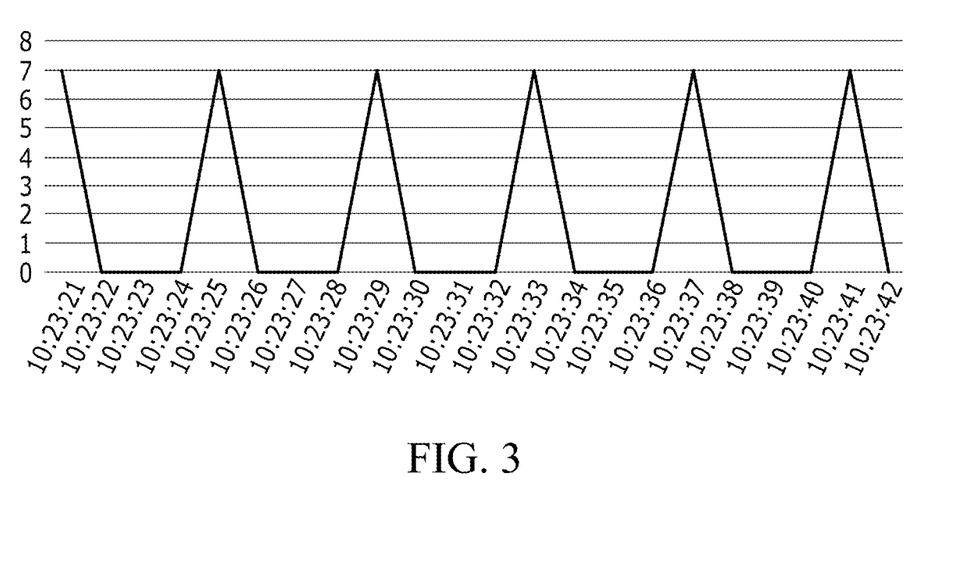
FIG. 3 indicates a bandwidth requirement (that is, time slots) for a data network.

FIG. 3 illustrates an exemplary signal profile of a single receiving system over time. Time ticks are set forth on the X axis. The requested content is retrieved (and stored) from the content delivery network, as initiated by the receiving system, in bursts, followed by periods of no signal activity. As shown, a signal (content or data) is transmitted over the network during six different time intervals (including the time interval 10:23:24 to 10:23:26 and the time interval 10:23:28 to 10:23:30). The data transmissions are indicative of the bandwidth requirements for delivery of signals during typical time intervals.

The deduplication process of the present invention avoids the transmission of redundant data from a source (the packaging and manifest creation system 102 in FIG. 1) to a destination (the receiving system 104 in FIG. 1). And in another embodiment, omits inclusion of duplicate data in the linear data or content stream that is generated by the receiving system.

Figure 4:
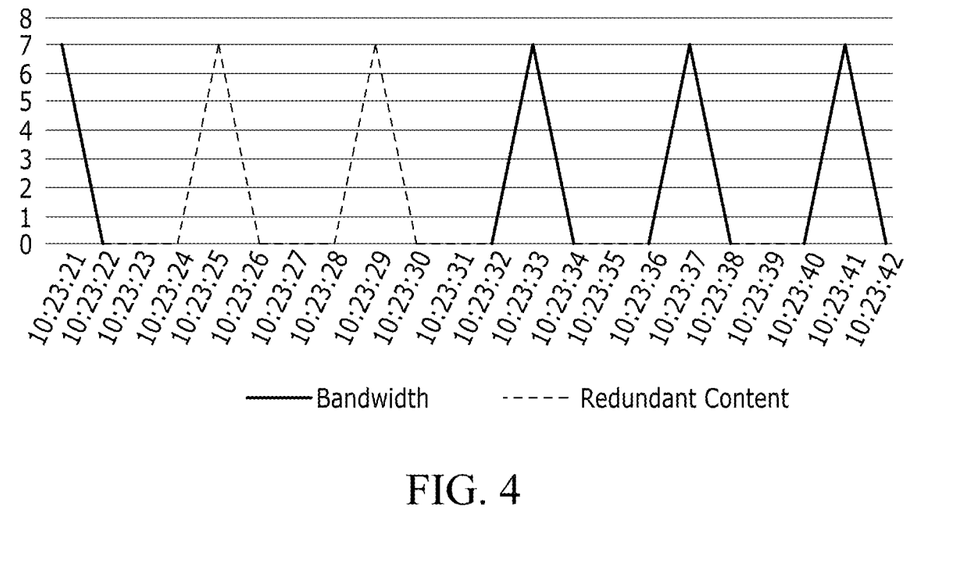
FIG. 4 indicates redundant data in the content or data stream.

In FIG. 4, two content time intervals are identified as duplicates by the signature engine as stored within the local fragment storage 108 of FIG. 1. The redundant data, as indicated by dashed lines, was sent between the time interval 10:23:24 to 10:23:26 and the interval 10:23:28 to 10:23:30. The manifest is modified and using the modified manifest, the receiving system will not request the redundant content from the packaging system 102 or in another embodiment the redundant content will not be included in the linear data stream created by the receiving system.

Figure 5:
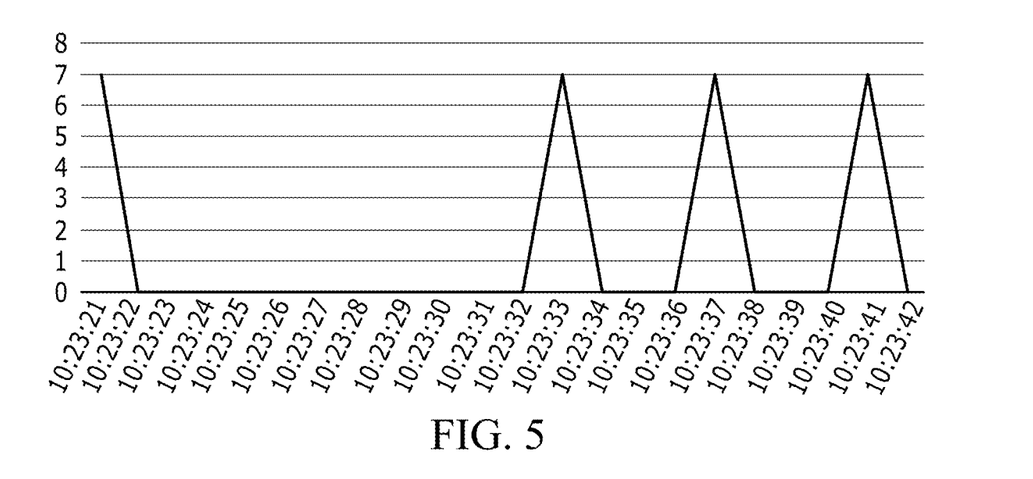
FIG. 5 illustrates the effects on the data stream when the redundant data has been deleted.

FIG. 5 depicts the signal created by avoiding transmission of the duplicate data, that is, the two redundant content time intervals from FIG. 4 are absent from the FIG. 5 the data stream. FIG. 5 depicts the bandwidth profile of the receiver when the two time intervals of redundant data have been eliminated from the manifest, thereby creating an extended period with no network activity, i.e., white spaces.

This lack of network activity during the white spaces represents excess network capacity that can be used to pre-deliver content to the receiving system. This is accomplished by the signature engine sending the receiving system an updated or modified manifest that informs the receiving system of this new content and from where it can be retrieved and stored for later use. Or the new content can be immediately inserted into the current linear stream during the time interval formerly occupied by duplicate or redundant data.

In another embodiment, locally-produced content is inserted into the white spaces.

Figure 6:
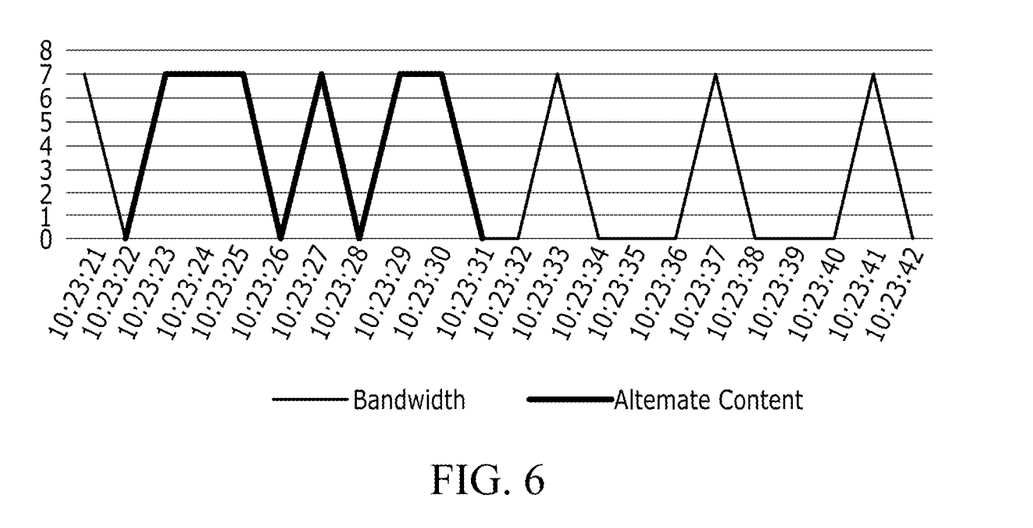
FIG. 6 illustrates delivery of alternative content during the time intervals that had been occupied by the redundant data.

The content occupying the former white spaces is indicated in FIG. 6 by the bold signal lines.

The above-described embodiment optimizes the delivery of media content, in particular by removing redundant media content. In fact, these same concepts can be applied to the streaming of any data. In particular these concepts can be applied to any highly repetitive data that is delivered in real-time, such as data delivered by IoT sensors.

The described approach may be considered a form of data compression, where data compression is defined as the ability to reduce the data file size by taking advantage of the statistical redundancy within the data stream. For example, instead of sending data as 1111111111, a dictionary-based symbolic replacement is sent instead, i.e., send the character "A" and it replaces the ten ones in the original data stream.

But in the world of streaming information using such a symbolic replacement is a difficult process because the data is constantly changing and the information represented by the streaming data must be sent (transferred to a receiving node) in real-time.

Thus, one approach for reducing the required bandwidth in streaming data uses the inventive approach where the real-time data stream is broken into windows of time (also referred to as data windows or data fragments or data packages) and each window is assigned a signature. One element of the system compares the signatures (representing a data window) that are to be sent against the signatures previously sent and stored at the receiving system (stored while awaiting transmission to another network).

When the signatures match, the receiving system is advised that the data window that was to have been sent was previously sent and therefore that data window does not need to be transferred again. The stored matching data window can be transferred to a next node in the network or to a different network at the appropriate time or when requested. Since this signature/data match is detected before sending the second data window the time interval during which the second window was to have been sent is now open and alternative data can be sent during that interval.

For this technique to perform without error, the receiving system obviously must store all data received until instructed that it is no longer needed.

Figure 7:
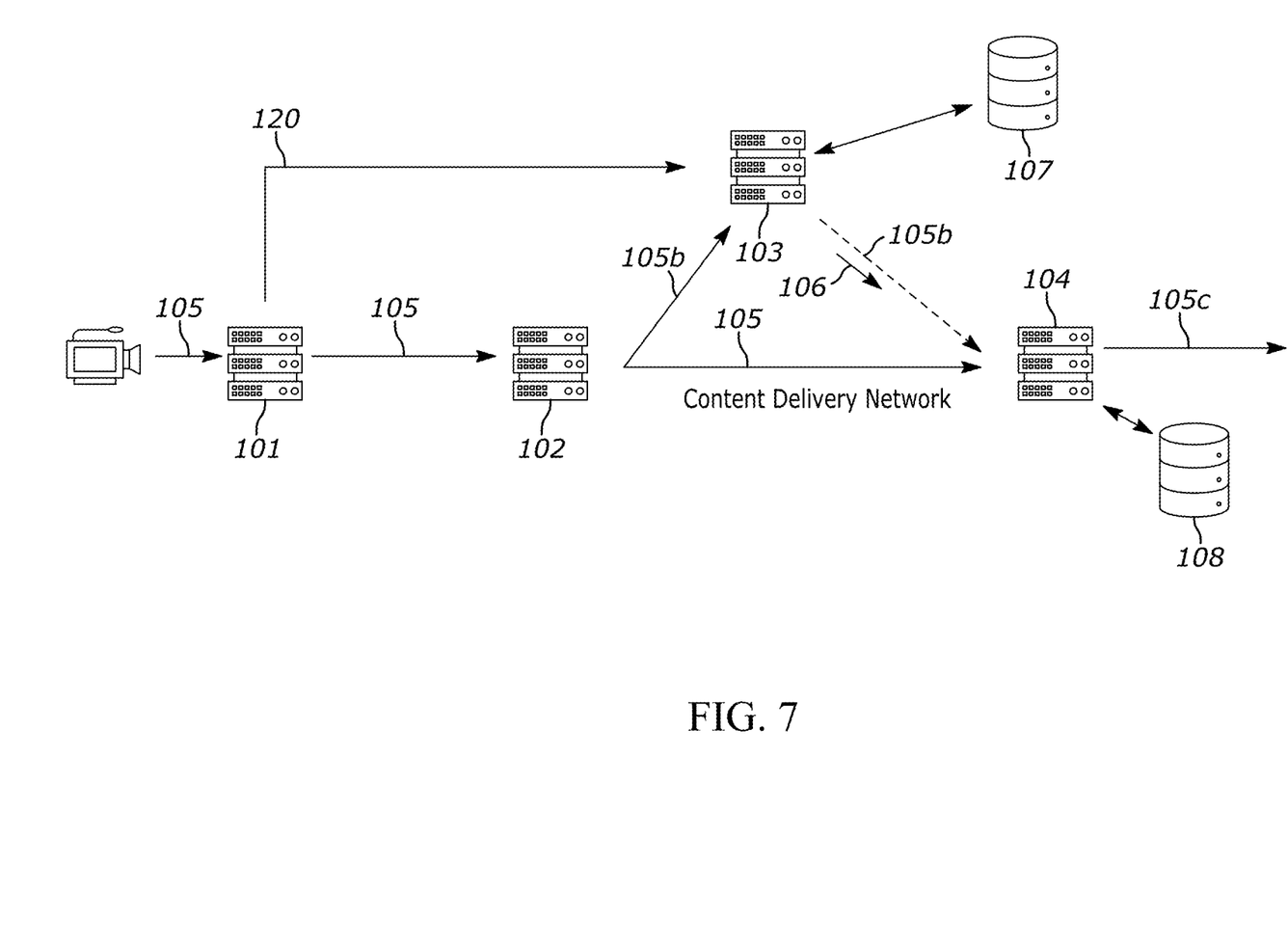
FIG. 7 illustrates an alternative embodiment wherein a signature engine receives a media list from a linear processing device.

FIG. 7 illustrates an embodiment wherein the signature engine 103 receives media lists (from the linear processing device 101) via a path 120 that also identify fragments and the content from which they are sourced. The list may be used to identify fragments that are not in the current delivery chain, but may be required in the future. These fragments are interleaved with existing data flows using the white space gaps in bandwidth to pre-deliver content to the content delivery network. The signature engine can release a modified manifest which can be a mix of pre-delivered content, active content, and locally resourced cached content from the local fragment storage 108.

Figure 8:
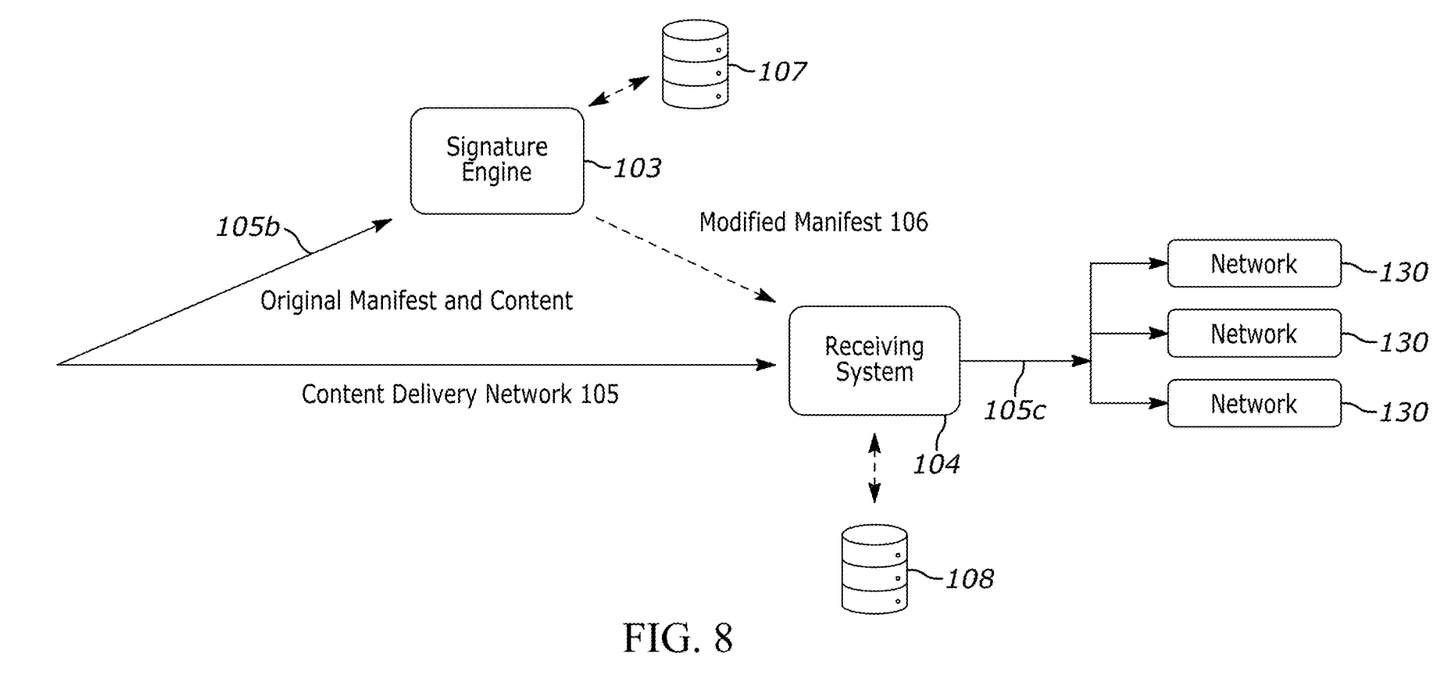
FIG. 8 illustrates system components similar to those illustrated in FIG. 1.

FIG. 8 illustrates a system similar to FIG. 1. The signature engine 103 generates a unique signature for each data package, compares each signature to signatures representing data packages already available to the receiving system. If a signature match is identified a modified manifest is created (omitting the redundant data package) and if a match is not detected the original manifest is sent to the receiving system.

The receiving system 104 receives a manifest (either the original or modified/updated manifest). If a data package on the manifest is stored locally it is retrieved from local storage (local fragment storage 108) and if not available locally the data package is retrieved from the content delivery network 105.

What is claimed is:

1. A method for providing content as a linear content stream, the method comprising:
receiving and segregating the content into data packages;
identifying each data package with a unique signature;
responsive to a request from a receiving system, receiving first data packages at the receiving system;
storing the first data packages;
creating a modified manifest that identifies each data package according to its unique signature, indicates a location for each data package, and instructs the order in which to assemble identified data packages to create the linear content stream;
identifying and deleting redundant data packages within the first data packages from the modified manifest, such that redundant data packages will not be present in the linear content stream; and
wherein deleting redundant data packages from the modified manifest creates white spaces of open time intervals within the modified manifest;
filling the white spaces with alternative content;
creating the linear content stream according to the modified manifest; and
providing the content according to the linear content stream.

2. The method of claim 1, wherein content comprises media content or data content.

3. The method of claim 1, wherein the alternative content comprises pre-delivered content or locally-sourced content.

4. The method of claim 2, wherein the pre-delivered content was previously supplied to the receiving system and stored for future use.

5. The method of claim 1, wherein the unique signature comprises a hash based on contents of a data package.

6. The method of claim 1, further comprising creating an original manifest based on received first data packages, wherein the modified manifest is derived from the original manifest by omitting redundant data packages and adding the alternative content.

7. The method of claim 1, wherein the first data packages are retrieved from a content delivery network.

8. The method of claim 1, further comprising responsive to a request from the receiving system, receiving second data packages at the receiving system, wherein the second data packages are retrieved from a storage cache, wherein redundant data packages within the first data packages and the second data packages are excluded from the modified manifest and thereby excluded from the linear content stream.

9. The method of claim 8, wherein the storage cache comprises a local storage cache.

10. The method of claim 1, wherein the unique signature of each data package is derived from a hashing algorithm operating on contents of each data package, and wherein redundant data packages are determined based on identical unique signatures.

11. A method for providing content as a linear content stream, the method comprising:
receiving and segregating the content into data packages;
identifying each data package with a unique signature;
responsive to a request from a receiving system, receiving first data packages and second data packages at the receiving system, the first data packages supplied from a content delivery network and the second data packages supplied from a storage cache;
storing the first and second data packages;
creating a modified manifest that identifies each one of the first and second data packages according to its unique signature, indicates a location for each one of the first and second data packages, and instructs the order in which to assemble identified first and second data packages to create the linear content stream;
identifying and deleting redundant data packages within the first data packages from the modified manifest, and identifying and deleting redundant data packages within the second data packages from the modified manifest, such that redundant data packages from the first data packages and redundant data packages from the second data packages will not be present in the linear content stream; and
wherein deleting data packages from the modified manifest creates white spaces of open time intervals within the modified manifest;
filling the white spaces with alternative data packages comprising alternative content;
creating the linear content stream according to the modified manifest; and
providing the content according to the linear content stream.

12. The method of claim 11, wherein the alternative content comprises media content or data content.

13. The method of claim 11, wherein the alternative content comprises pre-delivered content or locally-sourced content.

14. The method of claim 13, wherein the pre-delivered content was previously supplied to the receiving system and stored for future use.

15. The method of claim 11, wherein the unique signature comprises a hash based on contents of a data package.

16. The method of claim 11, further comprising creating an original manifest based on received first data packages and received second data packages, wherein the modified manifest is derived from the original manifest by omitting redundant data packages and adding the alternative content.

17. The method of claim 11, wherein the first data packages are retrieved from a content delivery network and the second data packages are retrieved from a storage cache.

18. The method of claim 11, wherein the unique signature of each one of the first data packages and each one of the second data packages is derived from a hashing algorithm operating on contents of each data package, and wherein redundant data packages are determined based on identical unique signatures.

19. A method for providing content to a network, the method comprising:

a source for collecting data and segregating the data into data packages, the content represented by the data packages;

identifying each data package with a unique signature;

creating a manifest that identifies each data package according to its unique signature and indicates a location for each data package;

identifying and deleting redundant data packages from the manifest, wherein redundant data packages are determined by identical signatures, and wherein deleting redundant data packages create white space of open time intervals;

filling the white spaces with alternative content;

modifying the manifest to include the alternative content;

a receiving system requesting data packages according to the manifest;

providing requested data packages to the receiving system according to a modified manifest, the requested data packages retrieved from a storage location or from a content delivery network.

20. The method of claim 1, wherein the first data packages are processed asynchronously and the linear data stream is processed synchronously.

\* \* \* \* \*